United States Patent [19]
Brandon et al.

[11] Patent Number: 5,255,172
[45] Date of Patent: Oct. 19, 1993

[54] MESSAGE ILLUMINATION ASSEMBLY AND METHOD OF MANUFACTURE

[75] Inventors: Thomas A. Brandon, Livonia; Santo S. DeMaggio, deceased, late of Warren, by Marion Steinbrecher, Executrix; Vern E. Welch, Reading, all of Mich.

[73] Assignee: Ford Motor Company, Dearborn, Mich.

[21] Appl. No.: 951,506

[22] Filed: Sep. 25, 1992

[51] Int. Cl.⁵ .............................................. F21V 1/00
[52] U.S. Cl. ...................................... 362/240; 362/362
[58] Field of Search .................. 362/367, 61, 240, 362

[56] References Cited
U.S. PATENT DOCUMENTS

| | | | |
|---|---|---|---|
| 4,101,159 | 7/1978 | Stewart | 296/37.7 |
| 4,177,497 | 12/1979 | McCook et al. | 361/331 |
| 4,227,241 | 10/1980 | Marcus | 362/61 |
| 4,254,457 | 3/1981 | Lordier | 362/367 |
| 4,263,072 | 4/1981 | Bull et al. | 156/73.1 |
| 4,428,030 | 1/1984 | Baliozian | 362/18 |
| 4,658,340 | 4/1987 | Bodenseick et al. | 362/267 |
| 4,868,725 | 9/1989 | Sakagawa et al. | 362/61 |

Primary Examiner—Carroll B. Dority
Attorney, Agent, or Firm—Roger L. May; Daniel M. Stock

[57] ABSTRACT

A message illumination assembly is provided which is formed from a single piece of molded plastic. The single piece of molded plastic includes at least one living hinge which allows it to be folded upon itself to form a light enclosure. The plastic piece further includes partitions which form light-tight chambers when the piece is folded upon itself. In addition, the single plastic piece is formed in a simple, two-segment mold.

16 Claims, 5 Drawing Sheets

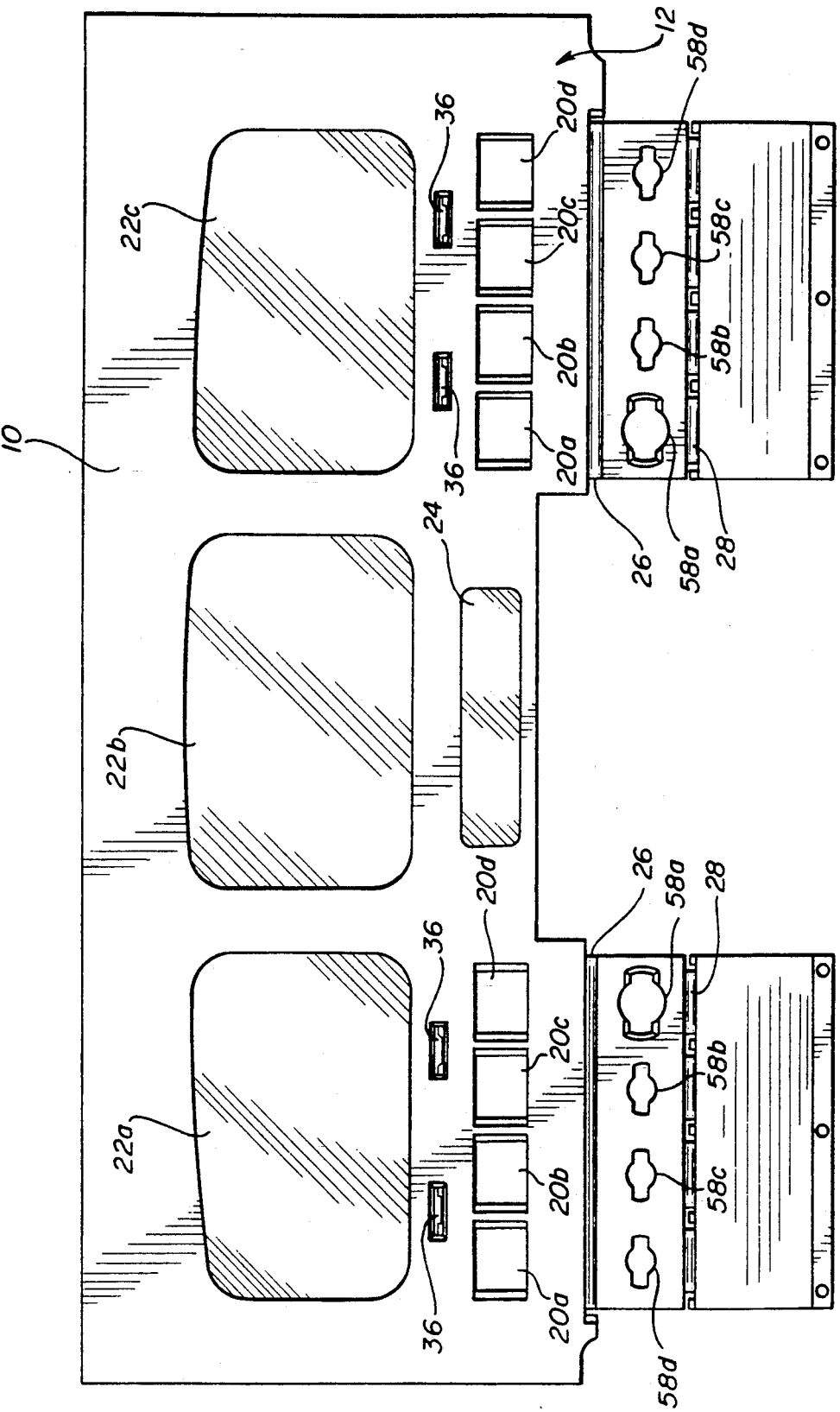

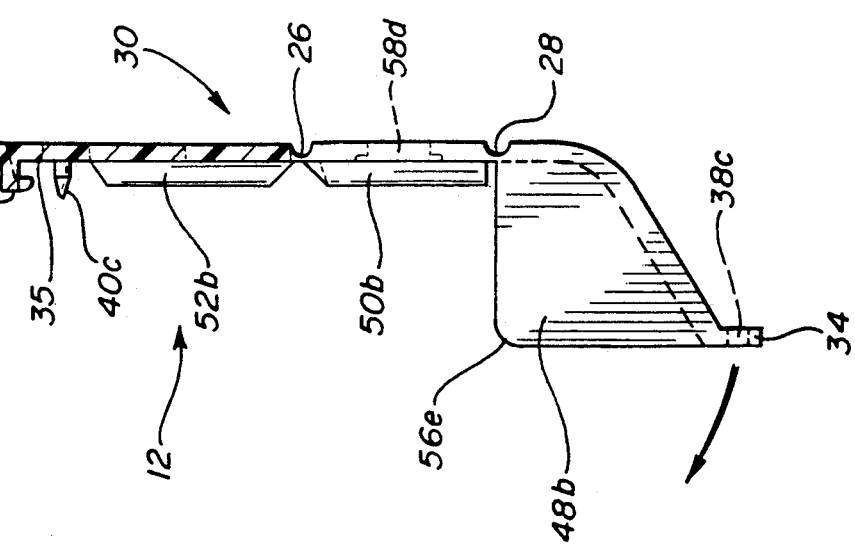
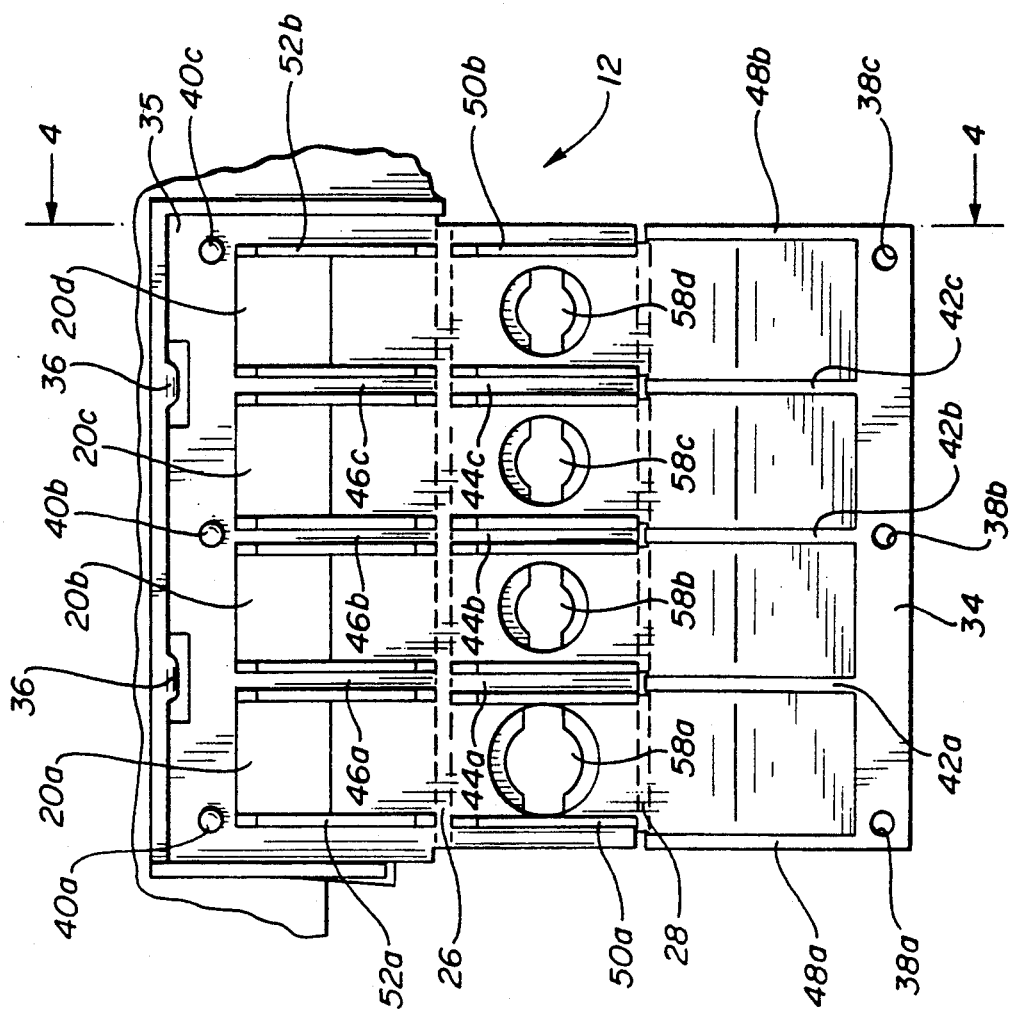

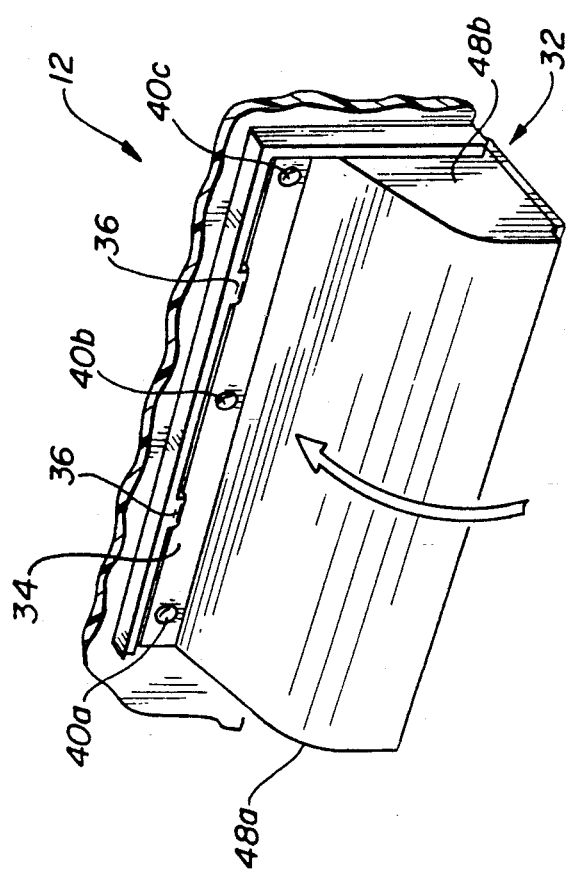
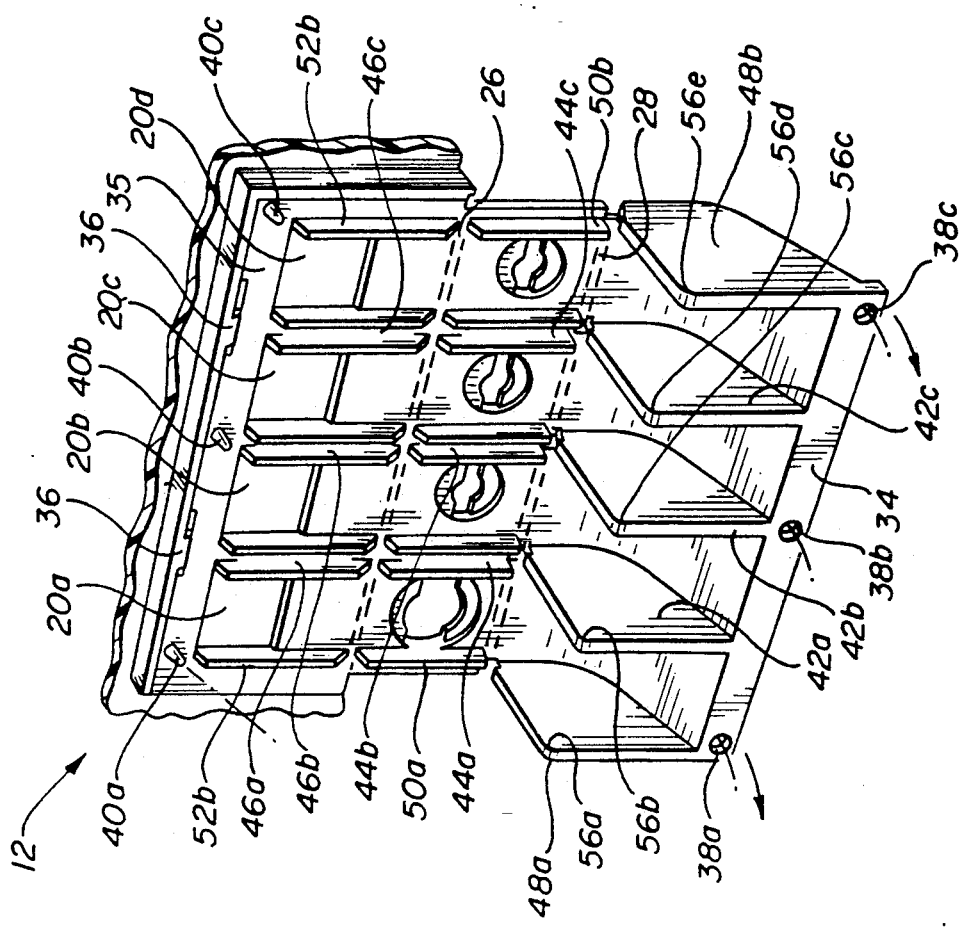

MESSAGE ILLUMINATION ASSEMBLY AND METHOD OF MANUFACTURE

BACKGROUND OF THE INVENTION

The present invention relates to message illumination assemblies and, more particularly, to ones having light enclosures with individual light chambers which can be manufactured and assembled from a single piece of plastic.

Instrument clusters are utilized in automobiles and the like to provide information to the driver or operator. Instrument clusters typically include one or more message illumination by a light source upon the illumination assembly includes a grouping of indicator messages which are illuminated by a light source upon the occurrence of a predetermined condition. In automobiles, for example, message illumination assemblies may provide indicator messages for low oil pressure, high temperature, non-fastened seat belts, engaged parking brake, etc. When one of these conditions occurs, a light source corresponding to the proper indicator message will be activated, thereby illuminating the indicator message to inform the driver of the condition.

Generally, message illumination assemblies are provided with means to direct as much of the light from the light source as possible through the indicator message. In this manner, the driver will not be confused as to which indicator message is illuminated, and the illumination requirements of the light source will be minimized. Such means for directing the light through the indicator message typically include a light enclosure which is formed behind the indicator messages. Partitions are included within the light enclosure to provide a separate light chamber behind each indicator message. A separater light source is placed inside of each light chamber. Two openings are provided in each chamber—one for entry of the light source, and one through which light passes to the indicator message.

In the past, such message illumination assemblies have been constructed from two or more separate molded plastic pieces. After being molded, the pieces are assembled and affixed to one another to form the light enclosure of the message illumination assembly. An example of a message illumination assembly/light enclosure formed in this manner is disclosed in U.S. Pat. No. 4,177,497 to McCook et al. Such message illumination assemblies are disadvantageous, however, particularly in terms of their manufacture.

The manufacture of conventional message illumination assemblies necessitates the molding and assembly of two or more individual plastic pieces to form the light enclosure portion. If the light source and indicator message openings are located on adjacent surfaces, the light enclosure portion requires at least one of the plastic pieces to be made from a complicated three piece slide mold or yet another additional piece of plastic.

Such manufacturing requirements are disadvantageous for a number of reasons. At least twice the mold components, molding steps, and costs are encountered as compared to the manufacture of a single plastic piece. If three piece slide molding is used for some of the multiple plastic pieces, expensive mold tooling costs, more frequent maintenance, and increased molding cycle time result. In addition, the variances which occur due to the enclosure's multiple plastic parts (such as warpage, shrinkage, final assembly, etc.) must be tightly maintained to prevent light leakage between individual chambers of the completed assembly. On the other hand, the variances that could contribute to leakage in a single piece of plastic light enclosure would be almost completely eliminated.

Accordingly, it is seen that a need exists in the art for a message illumination assembly having a light enclosure which can be formed in a simple, two-segment mold without the necessity of utilizing a mold slide, and which can be formed from a single piece of molded plastic to virtually eliminate multi-part mating variances and resultant light leakage.

SUMMARY OF THE INVENTION

That need is met by the present invention which provides a message illumination assembly which is formed from a single piece of molded plastic. The single piece of molded plastic includes at least one living hinge which allows it to be folded upon itself to form a light enclosure. The plastic piece further includes partitions which form light-tight chambers when the piece is folded upon itself. In addition, the single plastic piece is formed in a simple, two-segment mold.

In accordance with one aspect of the present invention, a message illumination assembly is provided which comprises at least one light enclosure formed from a single piece of molded plastic and includes at least one living hinge. The light enclosure further includes at least one partition positioned within and integral with the light enclosure to form separate chambers therein.

In accordance with another aspect of the present invention, a method of producing a message illumination assembly having at least one light enclosure is provided, the method comprising the steps of:

a) forming an injection mold from two mold segments to produce a cavity therebetween, the cavity having at least one area of reduced thickness so that the message illumination assembly will have at least one area of reduced thickness;

b) injecting melted plastic into the mold, the plastic being of a type which forms a rigid structure upon cooling;

c) cooling the plastic to form the message illumination assembly; and d) folding the message illumination assembly along the area or areas of reduced thickness to form the light enclosure.

Accordingly, it is an object of the present invention to provide a message illumination assembly having a light enclosure with adjacent light source/indicator message openings which can be formed in a simple, two-segment mold without the necessity of utilizing a slide piece.

It is a further object of the present invention to provide a message illumination assembly which can be formed from a single piece of molded plastic to eliminate multi-part mating tolerances and resultant light leakage.

These and other objects and advantages of the present invention will become apparent from the following detailed description, the accompanying drawings, and the appended claims.

BRIEF DESCRIPTION OF THE DRAWINGS

FIG. 2 is a front elevational view of an instrument display panel having two message illumination assemblies of the present invention after being removed from an injection mold but prior to the message illumination assemblies being folded upon themselves to form light enclosures.

FIG. 3 is a rear elevational view of one of the message illumination assemblies of FIG. 2.

FIG. 4 is a cross-sectional view of the message illumination assembly of FIG. 3 taken along lines 4—4.

FIG. 5 is a perspective view of the message illumination assembly of FIG. 3.

FIG. 6 is a perspective view of the message illumination assembly of FIG. 5 after it has been folded upon itself to form a light enclosure.

DETAILED DESCRIPTION OF THE PREFERRED EMBODIMENT

Figure 1:
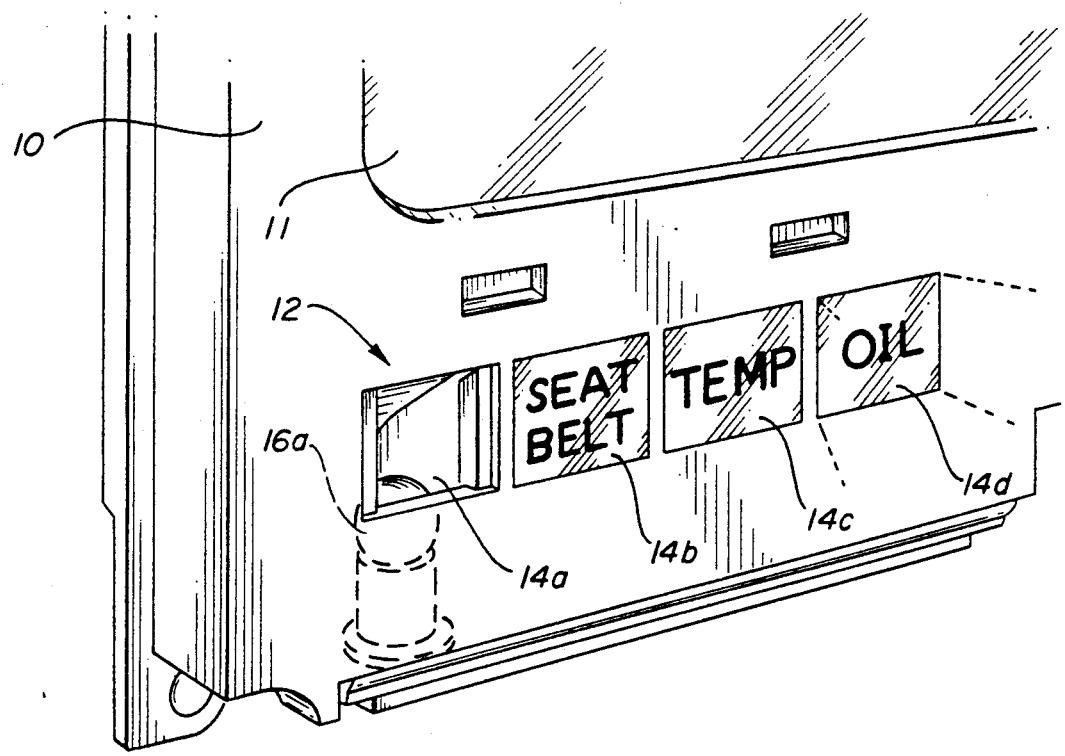
FIG. 1 is a perspective view of the message illumination assembly of the present invention.
Figure 8:
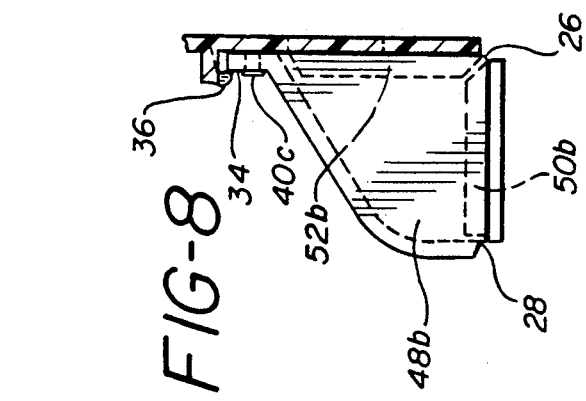
FIG. 8 is a cross-sectional view of the message illumination assembly of FIG. 7 taken along lines 8—8.
Figure 7:
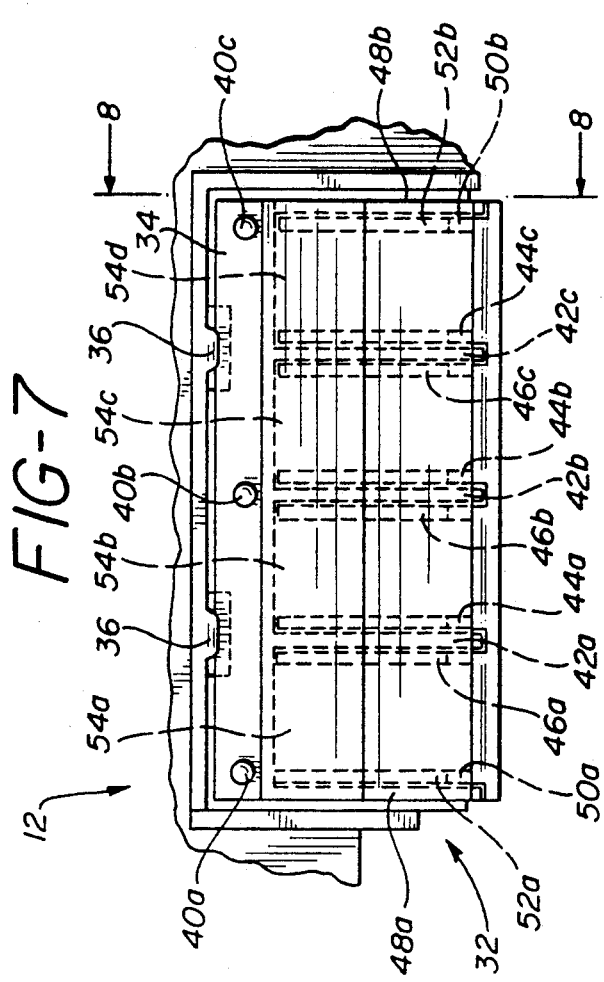
FIG. 7 is an elevational view of the message illumination assembly of FIG. 6.
Figure 9:
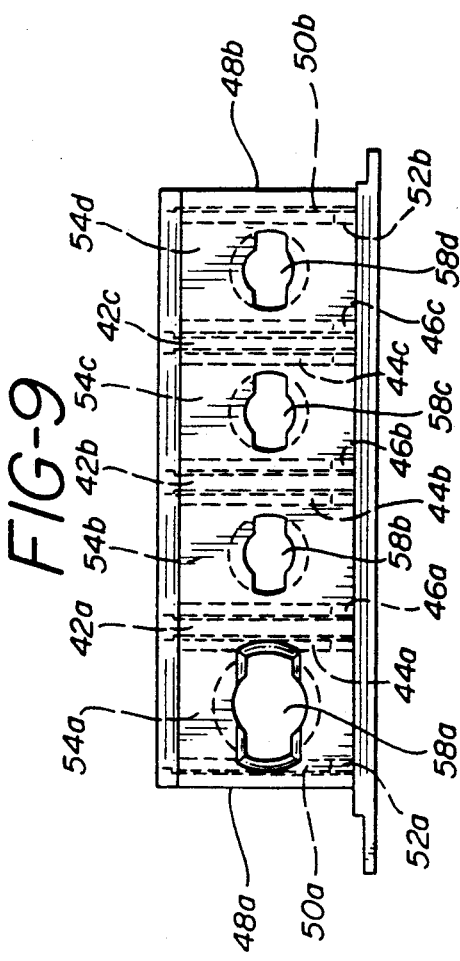
FIG. 9 is a bottom elevational view of the message illumination assembly of FIG. 7.

As shown in FIG. 1, instrument cluster 10 includes instrument display 11 and message illumination assembly 12. Instrument cluster 10 may be utilized in an automobile or the like to provide information to the driver or operator, such as the speed of the vehicle or the fuel remaining in the vehicle. Message illumination assembly 12 includes a grouping of indicator messages 14a (not shown), 14b, 14c, and 14d, which are illuminated by electric light sources 16a, 16b, 16c, and 16d, respectively (only 16a shown), upon the occurrence of a predetermined condition. Indicator message 14a has been omitted in FIG. 1 to show the positioning of light source 16a. Light sources 16a-d are positioned behind indicator messages 14a-d and are supplied with power by conventional means (not shown). An indicator message is an object which allows light to pass therethrough in a specific manner such that an illuminated message is conveyed to the driver or operator.

In automobiles, for example, indicator messages may provide warnings for low oil pressure, high temperature, non-fastened seat belts, engaged parking brake, etc. When such a condition occurs, a sensor in the automobile will cause an electrical signal to be sent to the light source corresponding to the indicator message which, when illuminated, will alert the driver to that condition. As illustrated in FIG. 1, indicator message 14b, when illuminated, provides an indication that a seat belt is not fastened. Similarly, when indicator message 14c or 14d is illuminated, the driver or operator is informed that the engine temperature is too high or that the oil pressure is too low, respectively.

Referring now to FIG. 2, the preferred method will be described for making the instrument display panel, and particularly the message illumination assembly, of the present invention. Generally, an injection mold is formed from two mold segments to produce a cavity therebetween. The cavity is formed into the pre-folded (this term will be explained below) shape of message illumination assembly 12. More preferably, the cavity is formed into the shape of instrument display panel 10, which includes two pre-folded message illumination assemblies 12. Melted plastic is then injected into the cavity and cooled to form the instrument display panel having the message illumination assemblies. This type of injection molding procedure to produce a plastic object is well known in the art.

The product of such a procedure is shown generally in FIG. 2 wherein instrument display panel 10 and two message illumination assemblies 12 have been produced simultaneously in the same injection mold, and are shown as they appear just after being removed from an injection mold. Alternatively, instrument display panel 10 may be produced separately from message illumination assemblies 12. In addition, the number of message illumination assemblies which are provided for each vehicle or the like may be varied as desired. In any event, openings 20a-d are provided for subsequent placement of indicator messages thereover. In addition, openings 22a-c and 24 may be formed in instrument display panel 10 to accommodate various instrument displays (e.g. tachometer, speedometer, etc.).

The specifics of the above injection molding procedure which are unique to the present invention will now be described. Reference is made to FIGS. 3-6 wherein message illumination assembly 12 of FIG. 2 is shown in greater detail. Whereas FIG. 2 shows pre-folded (i.e. just after being removed from an injection mold) message illumination assembly 12 as it appears from the front, FIGS. 3-5 show pre-folded message illumination assembly 12 from the rear. The injection mold, from which message illumination assembly 12 is made, is formed such that living hinges 26 and 28 are created on message illumination assembly 12. A living hinge is an area of reduced thickness on a molded plastic piece which allows the plastic piece to be bent along that area after it has been removed from the mold in which it was formed. In order to produce living hinges 26 and 28, the injection mold cavity in which message illumination assembly 12 is formed must have two areas of reduced thickness corresponding in size and shape to the desired size and shape of living hinges 26 and 28. As will be explained more fully below, it is living hinges 26 and 28 which allow the pre-folded message illumination assembly of FIGS. 2-5 to be folded upon itself to form a light enclosure.

Living hinges 26 and 28 are most clearly seen in FIG. 4. Preferably, living hinges 26 and 28 are formed to be approximately ⅓ as thick as the remainder of message illumination assembly 12. The remainder of message illumination assembly 12 preferably has a normal wall thickness of about 2 to about 3 millimeters. Preferably, living hinges 26 and 28 are formed to be concave on the outside surface 30 of message illumination assembly 12. As noted, message illumination assembly 12 is folded upon itself to form a light enclosure. When this occurs, surface 30 will be the outside surface of the light enclosure of message illumination assembly 12. When message illumination assembly 12 is folded upon itself to form a light enclosure, living hinges 26 and 28 will each be bent approximately 90° in the direction of the arrow in FIG. 4. It has been found that the concave shape of living hinges 26 and 28 on outside surface 30 prevents the plastic, from which message illumination assembly 12 is made, from fracturing during the folding process, and thereafter.

The preferred material from which message illumination assembly 12 is constructed is a plastic which is suitable for injection molding and which, upon cooling, forms a rigid structure; although, a semi-ridged plastic could also be used. More preferably, the plastic is a high-temperature resistant, impact-resistant one. Most preferably, the plastic is an acrylonitrile-butadiene-styrene (ABS) terpolymer.

The plastic may be injected into the injection mold, from which message illumination assembly 12 is made, in any conventional manner using conventional techniques. Preferably, however, the plastic should be injected into the mold in such a manner that it will flow across, as opposed to along, the portion of the mold which forms living hinges 26 and 28. This ensures that the polymers of the plastic will span living hinges 26 and 28. In this manner, living hinges 26 and 28 will be sufficiently resilient that they can be bent, to form a light enclosure, without fracturing.

After plastic has been injected into an appropriate two-segment injection mold to form message illumination assembly 12, the plastic is allowed to cool and message illumination assembly 12 is removed from the mold. Preferably, prior to the complete cooling of message illumination assembly 12, it is folded upon itself to form light enclosure 32. That is to say, before the plastic making up message illumination assembly 12 has completely rigidified, it is folded along living hinges 26 and 28, in the direction of the arrows in FIGS. 4, 5, and 6, to form light enclosure 32. Light enclosure 32 is shown most clearly in FIG. 6. After folding, lip 34 is snapped into the position shown in FIG. 6, against surface 35, by retaining clips 36. Retaining clips 36 receive lip 34 and secure it against surface 35. Simultaneously, retaining holes 38a, 38b, and 38c are slipped over plastic stakes 40a, 40b, and 40c, respectively. Heat is then applied to the portion of plastic stakes 40a-c protruding through retaining holes 38a-c, causing that portion to expand. Such a process, known as "heat staking," permanently fixes lip 34 to surface 35 to thereby permanently form light enclosure 32 of message illumination assembly 12.

It is preferred that message illumination assembly 12 include at least one partition which is positioned within and integral with light enclosure 32, thereby forming separate light chambers in light enclosure 32. More preferably, such partition is adapted to prevent substantially all light from passing from one light chamber to an adjacent light chamber. The preferred partitions for this purpose are shown in FIGS. 3-5 and FIGS. 7-9, wherein rib members 42a, 42b, and 42c are illustrated, along with groove members 44a, 44b, and 44c, and corresponding groove members 46a, 46b, and 46c. In addition, wall members 48a and 48b, along with corresponding lip members 50a, 50b, 52a, and 52b, prevent light, from a light source positioned within light enclosure 32, from escaping from light enclosure 32.

When message illumination assembly 12 is folded along living hinges 26 and 28, rib members 42a-c engage corresponding groove members 44a-c and 46a-c to form a light-tight seal. At the same time, wall members 48a-b engage corresponding lip members 50a-b and 52a-b to form a light-tight seal. In this manner, light chambers 54a, 54b, 54c, and 54d are formed in light enclosure 32. Moreover, by virtue of the corresponding engagement of rib members 42a-c with groove members 44a-c and 46a-c, substantially all light from a light source contained within light chambers 54a-d is prevented from passing to an adjacent light chamber. Also, because of the corresponding engagement of wall members 48a-b with lip members 52a-b and 54a-b, substantially all light from light sources 16a-d, contained within light chambers 54a-d, is prevented from escaping outside of light enclosure 32. The number of light chambers can b varied as desired.

Preferably, corners 56a, 56b, 56c, 56d, and 56e are rounded. When message illumination assembly 12 is folded upon itself, corners 56a-e will come into contact with living hinge 26. By rounding corners 56a-e, living hinge 26 is less likely to crack or shatter.

Advantageously, the one-piece construction of message illumination assembly 12 allows light chambers 54a-d to be formed with minimal mating variances, thereby preventing light leakage both between light chambers 54a-d, and out of light enclosure 32.

Each light chamber 54a-d is formed with two openings. First openings 58a, 58b, 58c, and 58d are formed in light chambers 54a-d, respectively, to allow a light source, such as light source 16a, to be inserted in each of light chambers 54a-d. The second openings in each of light chambers 54a-d are openings 20a-d, which allow light from light sources 16a-d to pass. In this manner, when an electrical signal is transmitted to one of light sources 16a-d, light therefrom passes through a corresponding one of indicator messages 14a-d to alert the driver or operator of the condition giving rise to the transmission of the electrical signal.

Advantageously, the molding process to form the message illumination assembly of the present invention requires only two mold segments, and does not require a mold slide. Thus the previously mentioned costs and difficulties associated with injections employing three piece mold slides are avoided.

While representative embodiments and certain details have been shown for purposes of illustrating the invention, it will be apparent to those skilled in the art that various changes in the methods and apparatus disclosed herein may be made without departing from the scope of the invention, which is defined in the appended claims.

What is claimed is:

1. A message illumination assembly comprising:
   at least one light enclosure formed from a single piece of folded molded plastic, said light enclosure including end walls molded on an inner surface thereof and two spaced living hinges; molded as part of the surface thereof
   at least one partition molded on an inner surface of said light enclosure to form separate chambers therein;
   each chamber having a first opening for insertion of a lighting means and also a second opening for placement of an indicator message thereover.

2. The message illumination assembly of claim 1 wherein said partition is adapted to prevent substantially all light from passing from one of said chambers to an adjacent one of said chambers.

3. The message illumination assembly of claim 2 wherein said partition comprises:
   one or more groove members molded to the inner surface of said light enclosure at a position which is opposite that of said partitions, said partitions and said one or more groove members being correspondingly engageable such that substantially all light is prevented from passing therethrough.

4. The message illumination assembly of claim 1 wherein said message illumination assembly is formed from a rigid plastic.

5. The message illumination assembly of claim 4 wherein said plastic is an acrylonitrile-butadiene-styrene terpolymer.

6. The message illumination assembly of claim 5 wherein said message illumination assembly has a normal wall thickness of about 2 to about 3 millimeters.

7. The message illumination assembly of claim 6 wherein said living hinge has a thickness which is approximately ⅓ that of said normal wall thickness.

8. The message illumination assembly of claim 1 comprising an indicator message positioned over said second opening in each of said chambers, said indicator message being illuminatably readable upon the emission of light from a light source contained within a corresponding one of said chambers.

9. A method of producing a message illumination assembly having at least one light enclosure, said method comprising the steps of:
   a) forming an injection mold from two mold segments to produce a cavity therebetween, said cavity having at least two areas of reduced thickness so that said message illumination assembly will have at least two areas of reduced thickness;
   two areas forming end walls and at least one area between the end walls forming a partition, and open areas for inserting at least two light sources and open areas for placing an indicator message thereover;
   b) injecting melted plastic into said mold, said plastic being of a type which forms a rigid structure upon cooling;
   c) cooling said plastic to form said message illumination assembly; and
   d) folding said message illumination assembly along said at least two areas of reduced thickness to form said light enclosure having at least two chambers, each having one of said open areas for inserting a light source and one of said open areas for placing an indicator message thereover.

10. The method of claim 9 wherein said area of reduced thickness is approximately ⅓ as thick as the remainder of said message illumination assembly.

11. The method of claim 9 wherein said area of reduced thickness is concave on the outside surface of said enclosure.

12. The method of claim 9 wherein said plastic is an acrylonitrile-butadiene-styrene terpolymer.

13. An instrument display panel having at least one message illumination assembly, said message illumination assembly comprising:
   a one-piece, molded plastic light enclosure formed from a rigid plastic, said light enclosure including a plurality of living hinges;
   a plurality of partitions positioned within and integral with said light enclosure to form a plurality of chambers, said partitions being adapted to prevent substantially all light from passing from one of said chambers to an adjacent one of said chambers and including
   a rib member molded to the inner surface of said light enclosure, and
   one or more groove members molded to the inner surface of said light enclosure at a position which is opposite that of said rib member, said rib member and said one or more groove members being correspondingly engageable such that substantially all light is prevented from passing therethrough;
   a first opening in each of said chambers through which to insert with a light source, and a second opening in each of said chambers through which light from a light source contained within a corresponding one of said chambers can pass; and
   an indicator message positioned over said second opening in each of said chambers, said indicator message being illuminatably readable upon the emission of light from a light source contained within a corresponding one of said chambers.

14. The instrument display panel of claim 13 wherein said one-piece, molded plastic light enclosure is formed from an acrylonitrile-butadiene-styrene terpolymer.

15. The instrument display panel of claim 14 wherein said one-piece, molded plastic light enclosure has a normal wall thickness of about 2 to about 3 millimeters.

16. The instrument display panel of claim 15 wherein said living hinge has a thickness which is approximately ⅓ that of said normal wall thickness.

* * * * *